United States Patent [19]

Doumov et al.

[11] Patent Number: 5,394,694

[45] Date of Patent: Mar. 7, 1995

[54] AUTOMATIC TRANSMISSIONS USING COMPACT HYDRODYNAMIC TORQUE CONVERTERS

[75] Inventors: Victor Doumov; Vadim Goland; Margarita Koupenskaia, all of Moscow, Russian Federation

[73] Assignee: Amercom Funding Ltd. II, New York, N.Y.

[21] Appl. No.: 137,607

[22] Filed: Oct. 15, 1993

[51] Int. Cl.$^6$ ............................................. F16D 33/00
[52] U.S. Cl. ....................... 60/363; 60/330; 416/197 C; 417/169; 417/197
[58] Field of Search ........................ 60/363, 340, 330; 416/180, 197 C; 417/169, 197

[56] References Cited

U.S. PATENT DOCUMENTS

| | | | |
|---|---|---|---|
| 2,752,859 | 7/1956 | Zeidler | 416/180 |
| 3,014,430 | 12/1961 | Schneider | 416/180 |
| 3,354,643 | 11/1967 | Paredes | 60/54 |
| 3,543,517 | 12/1970 | Ahlen | 60/54 |
| 3,940,929 | 3/1976 | Bezimensky | 60/330 |
| 4,012,908 | 3/1977 | Dundore | 60/354 |
| 4,080,786 | 3/1978 | Ahlen | 60/361 |
| 4,155,222 | 5/1979 | Ahlen | 60/361 |
| 4,180,978 | 1/1980 | Maddock | 60/345 |
| 4,260,330 | 4/1981 | Frotschner et al. | 416/180 |
| 4,391,096 | 7/1983 | Polzer et al. | 60/363 X |
| 4,448,354 | 5/1984 | Reznick et al. | 417/197 X |
| 4,608,823 | 9/1986 | Maze | 60/361 |
| 5,037,272 | 8/1991 | By | 416/180 |
| 5,120,196 | 6/1992 | By et al. | 416/180 |
| 5,259,191 | 11/1993 | Takino et al. | 416/197 C X |
| 5,271,716 | 12/1993 | Ejiri | 416/180 |

FOREIGN PATENT DOCUMENTS

| | | | |
|---|---|---|---|
| 130083 | 10/1932 | Germany | 417/167 |
| 587521 | 10/1933 | Germany | 417/197 |
| 1086128 | 7/1960 | Germany | 417/167 |
| 198639 | 12/1923 | United Kingdom | 417/167 |

Primary Examiner—Edward K. Look
Assistant Examiner—Hoang Nguyen
Attorney, Agent, or Firm—Norbert P. Holler; Mark J. Egyed

[57] ABSTRACT

A three element, three phase hydrodynamic torque converter having improved structural and hydrodynamic characteristics, and automatic transmissions that use a plurality of such hydrodynamic torque converters as replacements for multiple disc wet clutches or the like to effect transmission ratio changes. The hydrodynamic torque converters use a centrifugal impeller and a centrifugal turbine on the forward axial side of the torque converter, and a centripetal stator mounted to the converter shell on the rearward axial side. Three phase operation results when using the specified geometries: [1] torque multiplication, where the speed ratio $i = n_t/n_p$ is greater than one; [2] coupling phase, where the speed ratio approaches one; [3] extension phase, where the speed ratio equals one and then exceeds one. For operation with speed ratio $i = n_t/n_p$ in the range $0.6 \leq i \leq 1.3$, operational efficiency $\eta$ is found to be between 82 and 88 percent. Due to the specifed geometries, the torque coefficient $\lambda_1$ increases with increasing speed ratio i. The three phase hydrodynamic torque converters make possible a shifting coupling type transmission in which multiple power transmitting paths are individually coupled to independent torque converters. Energizing each power transmitting path results in effecting a different transmission ratio. The individual power transmitting paths are selectively energized by filling with hydraulic fluid the corresponding torque converter, while all other torque converters are voided automatically by the inherent automatic operation of an associated multi-nozzle Bernoulli fluid ejector, also described herein.

10 Claims, 9 Drawing Sheets

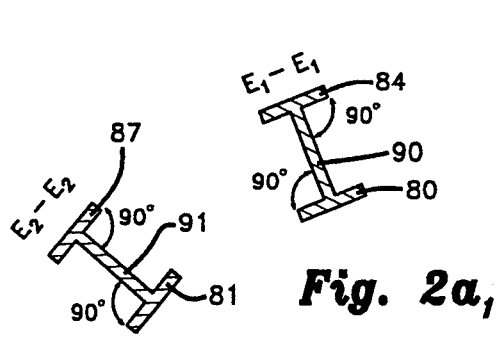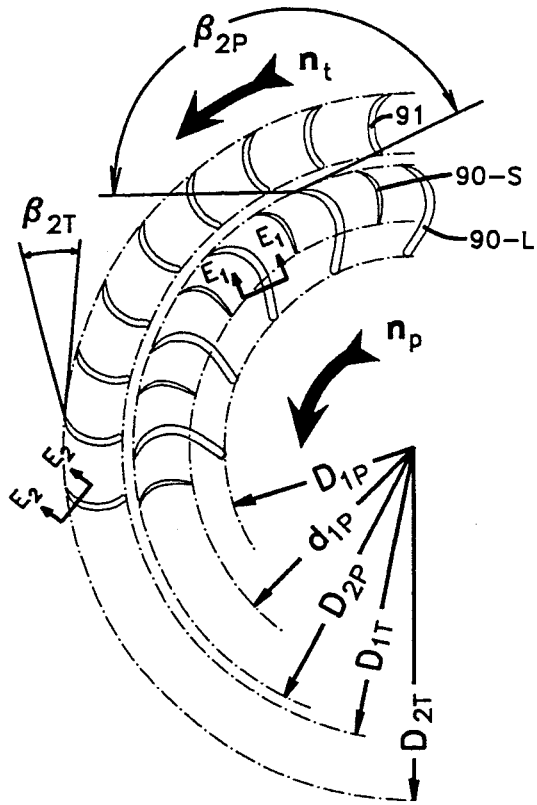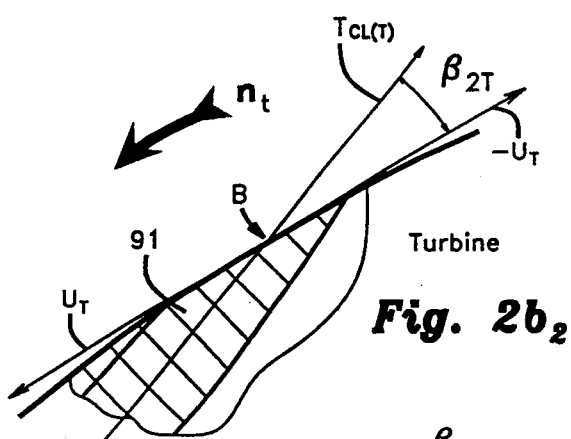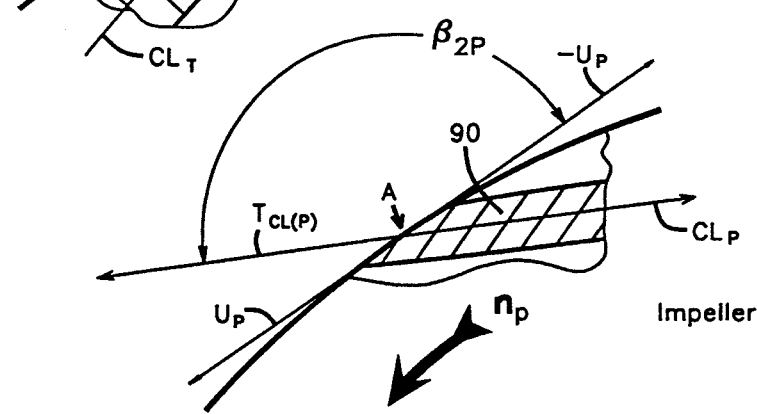

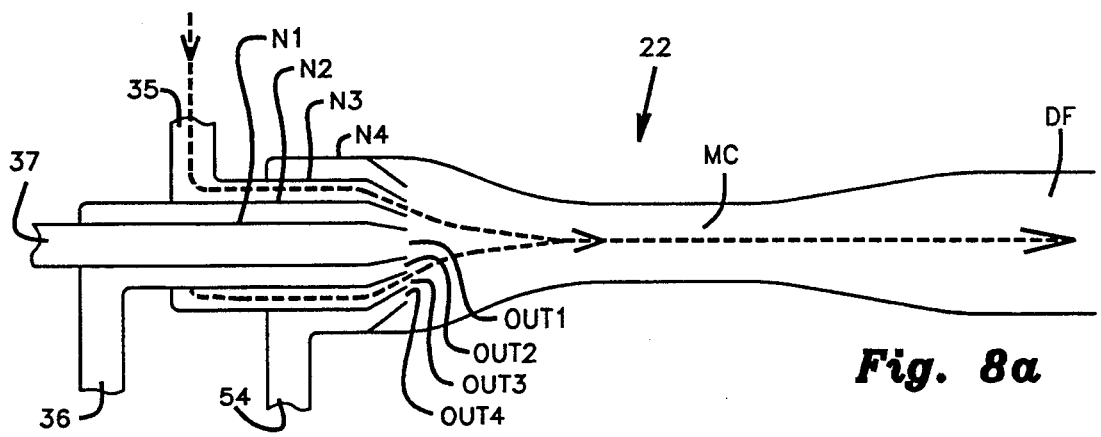
*Fig. 8a*
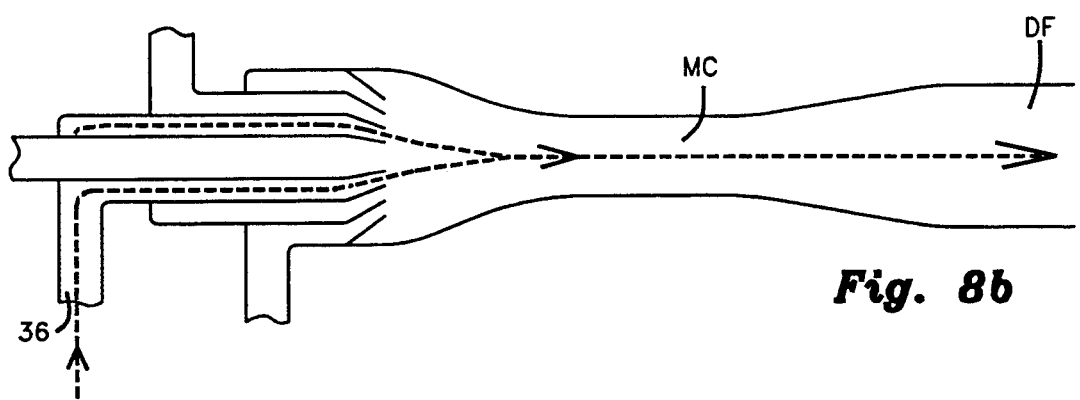
*Fig. 8b*
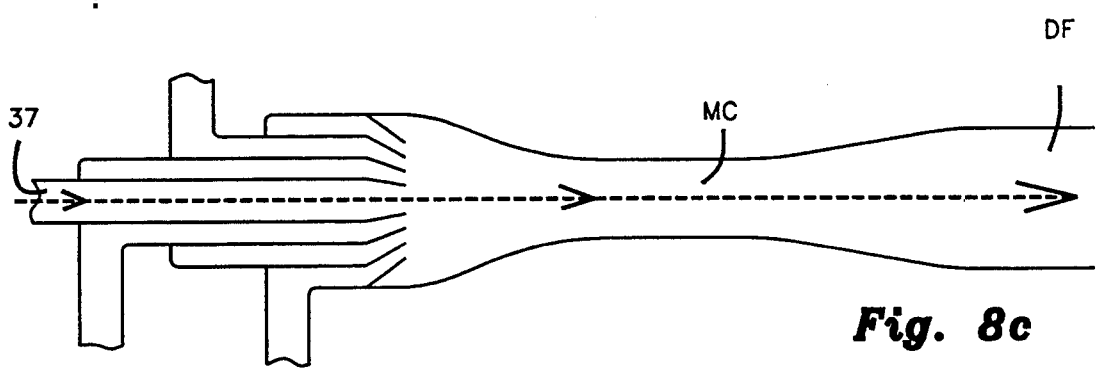
*Fig. 8c*
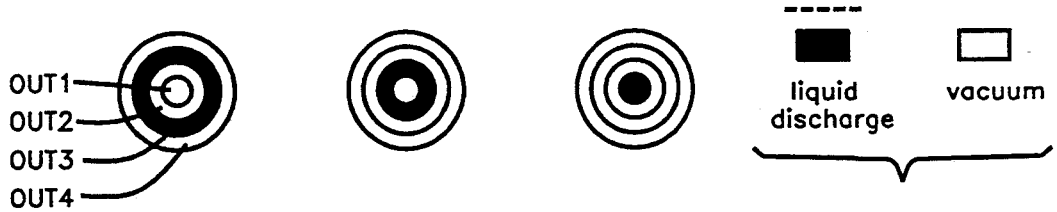
*Fig. 8d₁*   *Fig. 8d₂*   *Fig. 8d₃*   *Fig. 8d₄*

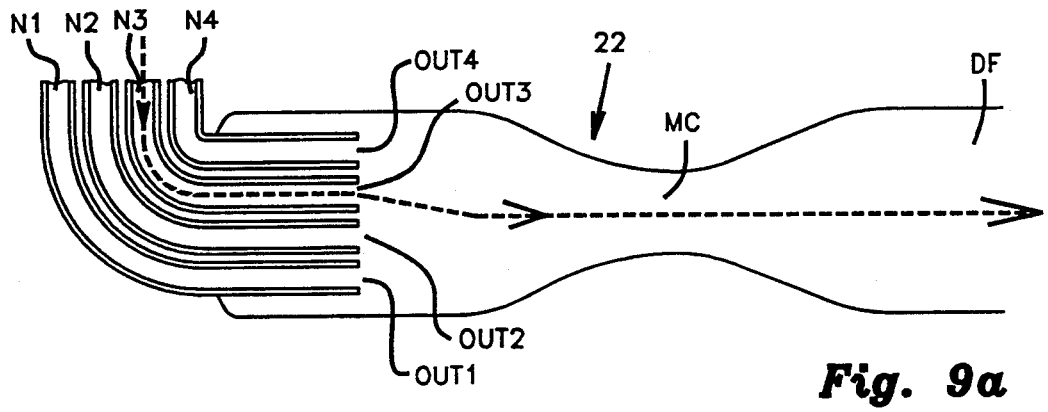
Fig. 9a
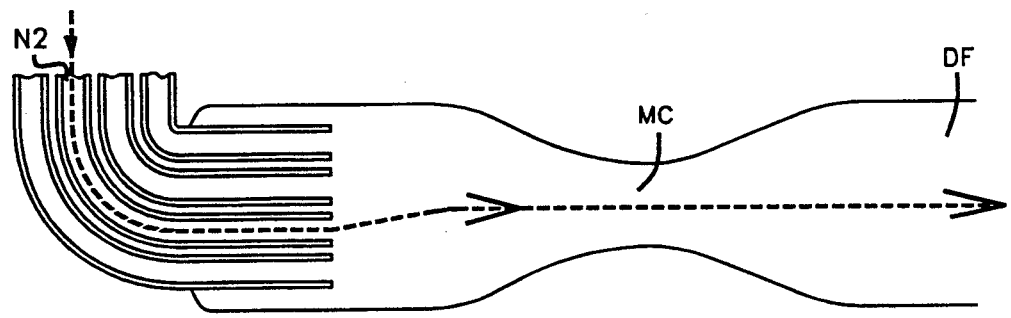
Fig. 9b
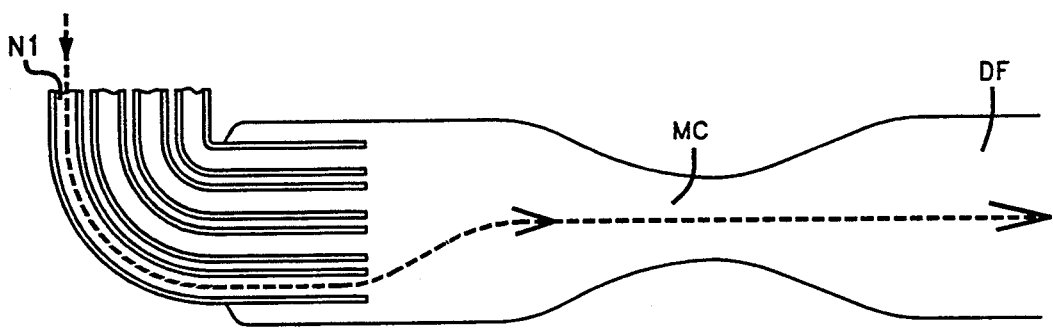
Fig. 9c
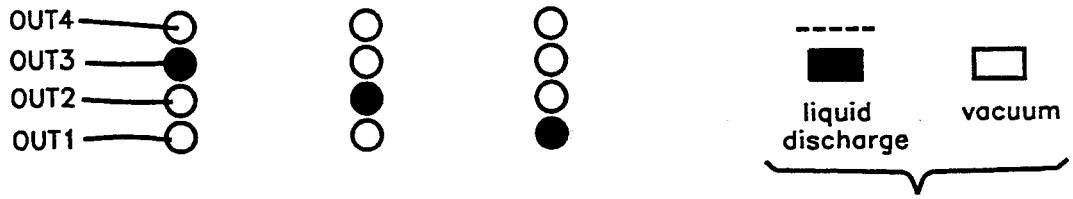
Fig. 9d₁     Fig. 9d₂     Fig. 9d₃     Fig. 9d₄

AUTOMATIC TRANSMISSIONS USING COMPACT HYDRODYNAMIC TORQUE CONVERTERS

BACKGROUND OF THE INVENTION

1. Field of the Invention

This invention relates to an improved fluid coupling device for mechanical power transmissions, either vehicular or stationary, where output angular speed or torque is systematically modulated. Specifically, the present invention relates to vehicular hydrodynamic torque converters having improved structural and hydrodynamic characteristics, and automatic transmissions that use a plurality of such hydrodynamic torque converters. However, as will be evident, the teaching presented here can be applied to power transmissions generally.

2. Background and Description of Prior Art

In transferring torque between the engine and transmission in passenger vehicles, a fluid coupling, usually a hydrodynamic torque converter, is widely used. Hydrodynamic torque converters usually perform two functions. They give a smooth coupling between the engine and transmission, with torsional damping at all engine speeds. Thus, they serve as a cushion in the driveline, protecting it from shock phenomena that might cause premature component failure, especially during transient conditions where torsional loading might otherwise exceed acceptable limits. They also give hydrodynamic torque multiplication, which is particularly helpful when accelerating from rest, passing, etc. The torque multiplication process and operation of the torque converter are simple, completely automatic and reliable, and hydrodynamic torque converters typically have anticipated service lifetimes well in excess of other transmission components to which they are connected.

A hydrodynamic torque converter typically comprises three separate independent coaxial elements that each use a plurality of flow directing blades: an impeller, or power input member, usually driven by the prime mover; a turbine or output member connected to an output shaft which usually becomes the input shaft of a subsequent geartrain; and a reaction member, commonly called the stator. The stator is generally fixed to the transmission case, sometimes via a one-way clutch, which will allow rotation of the stator blades in one direction under certain conditions.

The torque converter operates primarily as a closed or sealed system filled with hydraulic fluid, and its cover or shell, usually toroidal or doughnut-like in shape, is usually integral with or fixed to one of the three elements — the impeller, turbine, and stator. Hydraulic fluid circulated by the impeller impacts upon the turbine, effecting rotation of the turbine and transmission of torque through the torque converter. Hydraulic fluid leaving the turbine flows back again to the impeller.

The rotation of the impeller whenever the engine is running causes it to act as a pump, delivering hydraulic fluid to the turbine. If the impeller or the turbine ingests hydraulic fluid from a central location and delivers to a higher or maximum radius in the torque converter housing or shell, it is known as a centrifugal member; if it takes hydraulic fluid to a location of lower radius, it is known as a centripetal member.

As the impeller pumps hydraulic fluid radially and axially into the turbine, it also gives the fluid a circumferential velocity component as well (swirl). This oil engages or impacts the turbine, causing it to rotate in a like direction.

The coupling between the impeller and the turbine is not strong for low impeller speeds, and this allows the vehicle to remain at rest, even though the transmission is in a drive range and the engine is running. A relatively small increase in the rotational speed of the engine, however, will make the coupling between the impeller and the turbine stronger, with more torque transmitted through the torque converter.

Torque and kinetic energy are best exchanged between the impeller and turbine when the hydraulic fluid moved by the impeller follows the contours of the turbine blades, rather than impinging upon the turbine with a high angle of incidence. The shape of the turbine blades, however, generally leaves the oil passing through it moving in a direction that is not appropriate for re-entry into the impeller, that is, in a manner that would slow the impeller and cause great energy loss.

To redirect the hydraulic fluid so that it will enter the impeller in such a manner that it will assist the engine in turning the impeller, a stator is interposed in the hydraulic fluid flow path between the turbine and the impeller. The stator redirects the fluid flow from the turbine so that the momentum of the fluid is used to increase the impeller torque. This increase in impeller torque over the torque supplied to the impeller by the engine causes the ratio between turbine torque and engine torque to increase above unity, with the turbine torque reaching two or more times engine torque when needed. This is what accomplishes torque multiplication, and operation of the torque converter at this point is known as the torque multiplication or torque conversion phase.

As the turbine speed rises relative to the impeller speed, the stator no longer functions as much as a redirecting member for the oil, and the torque multiplication phenomenon subsides. Eventually, as the turbine speed rises further, the stator (often allowed to freewheel at this point by means of a one-way clutch) plays little or no role in the torque converter, and very little torque multiplication occurs. The speed ratio i, equal to the speed of the turbine $n_t$ divided by the speed of the impeller, $n_p$, then approaches 1:1, but for operation in a regime of acceptable efficiency, does not reach 1:1:

$$i = n_t/n_p < 1$$

This is known as the coupling phase of the torque converter, and operation at this point results in less energy lost in the torque converter in the form of heat than operation in the torque multiplication phase. [Ref: Mercure, R. A., *Review of the Automotive Torque Converter*, SAE Paper 790046; also SAE Publication AE-5, *Design Practices—Passenger Car Automatic Transmissions*, 1988, pp. 165–242]

Internal combustion engines only operate efficiently for certain engine speeds and throttle openings. Part of the function of any transmission is to assure operation of the engine in an efficient manner. For a given desired output power, fuel is generally best utilized when operation of the prime mover is selected to be at low engine speeds and high throttle openings, unless high output power is needed. Since much time is spent in passenger vehicles cruising at low output power, high ratio ranges are needed so that operation of the engine can proceed at low or optimum speeds for a wide variety of vehicular travel speeds.

In the past decade, a twin strategy has been used to minimize fuel consumption: [1] the use of high ratio range transmission gearing to keep engine speeds as low as possible, except when high power levels are needed; and [2] lockup of the hydrodynamic torque converter at any vehicle speeds approaching cruising speeds, generally after 40 km/hr, to prevent torque converter slip or energy loss. Lockup of a hydrodynamic torque converter occurs when the impeller and turbine are coupled directly using an independent clutch means, thus avoiding energy losses in the converter itself. This strategy has been vital in meeting fuel economy targets. The hydrodynamic torque converter may be used in the usual manner ("unlocked" or opened) at cruising speeds when torque multiplication is desired for increased torque at the driving wheels, but when torque multiplication is no longer needed, torque converter lockup recommences.

The higher transmission ratio ranges do, however, pose some problems. With the large ratio increments used in high ratio range transmissions, fuel economy comes at the expense of transmission responsiveness, since ratio changes involving unlocking the torque converter and effecting a large ratio shift will be suppressed somewhat to avoid the well known "hunting" phenomenon where repeated shifts occur back and forth between transmission ratios. The sluggish feel of the automatic transmission that results does not encourage acceptance of automatic transmission control.

This can be remedied in part by increasing the effective ratio range of the torque converter. Conventional hydrodynamic torque converters have an effective ratio range of only about 1.5–3.0 : 1. When torque converter coupling phase occurs as the vehicle gains speed, the highest speed ratio i attained is still less than one, $$i = n_t/n_p < 1$$

that is, the turbine never has a higher rotational speed than that of the impeller when the impeller is driven by the engine. A hydrodynamic torque converter that could deliver a speed ratio of greater than 1:1, e.g., 1.3:1, $$i = n_t/n_p = 1.3$$

without significant energy losses would go a long way toward allowing operation of the vehicle with an unlocked torque converter for longer periods, giving the smooth power and torque progression that only a hydrodynamic torque converter can provide.

Sizing of hydrodynamic torque converters is another area where an improvement would open up more possibilities. Certain automatic transmissions used in locomotive and diesel truck engines use multiple hydrodynamic torque converters to replace multiple disc wet clutches or the like that are used to effect transmission ratio changes. The multiple hydrodynamic torque converters are called shifting couplings, and transmissions using this arrangement can be made to have excellent ratio range and other characteristics. They are not, however, practical for application in passenger vehicles, mostly because of the size and weight of the conventional torque converters used. If the required size of the hydrodynamic torque converters could be reduced, this type of transmission as shown in FIG. 5 below would become more practical for use in passenger vehicles.

Addressing the question of torque converter size, it is important to note that for a given impeller speed, the torque capacity Mp of a hydrodynamic torque converter is essentially proportional to the fifth power of its diameter D:

$$M_p \propto D^5$$

This means that any decrease in diameter will drastically reduce the torque capacity $M_p$. A twelve percent reduction in diameter D, for example, cuts the torque capacity $M_p$ in half.

One way to reduce the required size of a hydrodynamic torque converter while maintaining its relative torque capacity is to utilize the converter at higher impeller input speeds. This can be done by the use of gearing between the engine output shaft and the impeller, to double, for example, the impeller input speed relative to an impeller coupled directly to the engine. This allows use of a smaller torque converter for a given required torque capacity, because [1] the torque capacity $M_p$ of a hydrodynamic torque converter is also proportional to the square of the impeller speed $n_p$, that is, $$M_p \alpha (n_p)^2$$

but much more significantly, [2] the torque required to transmit a given power through the torque converter is proportionally less due to the higher running speed of the impeller. Doubling the impeller input speed, for example, cuts in half the required torque M through the torque converter. This is a natural consequence of the fact that power P equals torque M times angular speed $\omega$:

$$P = M\omega$$

A problem in trying to increase the input speed of a conventional hydrodynamic torque converter arises because the impeller is typically part of the torque converter case. With the case rotating at increased speed, large transient bearing loads and vibration can result, given the mass of the converter shell and the oil contained therein. Fine rotational balancing of the converter case is required, and the added rotational inertia of the converter is undesirable in automatic transmissions for passenger vehicles.

Two other factors influence the torque capacity, and therefore the diameter, of a torque converter. The torque capacity is also proportional to the physical density $\gamma$ of the hydraulic or transmission fluid used, $$M_p \propto \gamma$$

which is more or less fixed because of the many engineering requirements that must be met, like lubrication properties for high mechanical efficiency, frictional properties to enhance the operation of any friction clutches such as a torque converter lockup clutch, resistance to temperature-induced deterioration, etc. In addition, there are the inherent qualities of a particular torque converter, its internal configuration, its blading (blade orientations, shapes, profiles, entrance and exit angles, etc.), and other internal geometries. This inherent effect on the torque capacity $M_p$ is expressed by a torque capacity coefficient $\lambda_l$, and it is usually determined empirically after building a torque converter and testing its operation. The actual torque capacity $M_p$ is a product of all the above-mentioned factors:

$$M_p = \lambda_1 \gamma (n_p)^2 D^5$$

Another problem associated with use of the shifting coupling transmission using multiple hydrodynamic torque converters in lieu of wet plate clutch or other shifting devices is that the hydrodynamic torque converters must be selectively and individually filled and drained quickly to effect the ratio changes, and since conventional hydrodynamic torque converters have a large interior volume, this typically requires 1–1.5 seconds. This long time period may be acceptable for locomotives, but is not a fast enough response time for use in passenger vehicles. Each time a transmission ratio change is to be effected, at least one hydrodynamic torque converter must be selectively drained and another filled within a small fraction of a second. Consistent switching of the hydraulic circuits is difficult in practice.

SUMMARY OF THE INVENTION

It is therefore an object of this invention to provide a hydrodynamic torque converter with a stationary case or shell, minimizing the above-cited problems associated with high rotational velocity.

It is another object of this invention to provide for a hydrodynamic torque converter that can tolerate operation at high impeller input speeds to allow a reduction in size for the same relative torque capacity.

It is another object of the invention to give a hydrodynamic torque converter having a ratio range greater than existing conventional torque converters, with efficient operation in an extension phase where $$i = n_t/n_p \geq 1.$$

It is another object of the invention to give a hydrodynamic torque converter having a higher torque coefficient $\lambda_l$ consistent with low energy losses within the torque converter itself.

It is another object of this invention to provide a shifting coupling type transmission using compact hydrodynamic torque converters of small size to keep transmission volume down and to facilitate selective filling and draining of the torque converters in a short time.

It is another object of this invention to provide a means for automatically draining or voiding unenergized torque converters in a reliable and inexpensive manner without any further action or switching being needed, thus reducing the time required to effect ratio changes.

Other objects of this invention and advantages over the prior art not given above will become clear from further reading of the specification.

The present invention provides for a hydrodynamic torque converter having improved structural and hydrodynamic characteristics.

The structural characteristics allow use of the converter at high input (impeller) speeds, generally two to three times higher than that of conventional automotive torque converters, thereby increasing the torque capacity and power handling capacity of the converter beyond what would be obtained if the converter were driven at usual engine speeds, e.g., 500–6500 RPM. This can allow for downsizing of the converters for many applications.

The improved hydrodynamic characteristics allow a third phase of operation called extension phase, where the speed ratio $i = n_t/n_p$ can go above one, e.g., 1.3. This is an unusual characteristic, giving ratio range extension beyond the usual widening provided by torque conversion. This improved ratio range of the torque converter can provide for greater driveability consistent with greater fuel economy relative to a conventional converter not having a third extension phase of operation.

The improved hydrodynamic torque converter can either be used at high input speeds in lieu of a conventional hydrodynamic torque converter, or as part of an automatic transmission using a plurality of such compact hydrodynamic torque converters as replacements for multiple disc wet clutches or the like to effect transmission ratio changes.

The hydrodynamic torque converter embodying the concepts of the present invention uses a bladed centrifugal impeller located in a forward axial end of the torque converter toroidal housing; a bladed centrifugal turbine also located in a forward axial end of the torque converter toroidal housing, radially outside the impeller; and a bladed centripetal stator fixed inside the rear axial end of the torque converter's stationary toroidal housing. In operation, oil flows from the impeller on the forward axial side of the torque converter, through the turbine, and axially over to the rearward half of the toroidal housing, meeting the stator blades.

Each impeller blade has an exit angle $\beta_{2P}$ between 140 and 170 degrees, inclusive, $$140 \leq \beta_{2P} \leq 170$$

but preferably between 150 and 160 degrees. Each turbine blade has an exit angle $\beta_{2T}$ between 14 and 30 degrees, inclusive, $$14 \leq \beta_{2T} \leq 30$$

but preferably between 16 and 21 degrees. The ratio of the turbine effective outer diameter to the impeller effective outer diameter is between 1.15 and 1.45, inclusive, $$1.15 \leq D_{2T}/D_{2P} \leq 1.45$$

but preferably between 1.18 and 1.25.

Preferably, about half of the impeller blades are long blades, having inner entrance edges substantially parallel to the impeller axis of rotation, with the effective long blade inner diameter $D_{1P}$ such that the ratio of the effective impeller outer diameter $D_{2P}$ to the effective impeller long blade inner diameter $D_{1P}$, $D_{2P}/D_{1P}$, is between 1.35 and 1.75, inclusive, $$1.35 \leq D_{2P}/D_{1P} \leq 1.75$$

but preferably between 1.45 and 1.55.

Successively alternated with the long blades are short blades, having inner entrance edges substantially parallel to the impeller axis of rotation, with the effective impeller short blade inner diameter $d_{1P}$ such that the ratio of the effective impeller outer diameter $D_{2P}$ to the effective impeller short blade inner diameter $d_{1P}$, $D_{2P}/d_{1P}$, is between 1.1 and 1.4, inclusive, $$1.1 \leq D_{2P}/d_{1P} \leq 1.4$$

but preferably between 1.18 and 1.25.

The invention also provides for a shifting coupling transmission using multiple compact hydrodynamic torque converters of small size, with an inexpensive and reliable way to selectively fill and drain the torque converters in a short time.

The shifting coupling transmission provides for multiple power transmitting paths to which individual and independent torque converters are connected. Energizing each power transmitting path results in effecting a different transmission ratio. The individual power transmitting paths are selectively energized by filling with hydraulic fluid the corresponding torque converter, while the other torque converters are voided automatically.

To realize such a transmission, input and output shafts are connected to multiple compact hydrodynamic torque converters via input and output geartrains such that for each power transmitting path, there is input gearing coupling the transmission input shaft to the impeller of an individual hydrodynamic torque converter, and there is output gearing coupling the turbine of the hydrodynamic torque converter to the output shaft. A conventional hydraulic pump is provided to selectively fill the torque converter for the desired power transmitting path, while the other unenergized torque converters are drained or voided automatically, without any further action needed, by a multi-nozzle fluid ejector.

The multi-nozzle fluid ejector uses multiple nested discharge nozzles mounted inside a tubular mixing chamber. Each discharge nozzle has its inlet connected to the toroidal fluid chamber of one torque converter. At any given time, only one torque converter is energized or filled, and as the conventional pump means maintains pressure inside that torque converter, one of the multiple nested discharge nozzles will support a high velocity stream of hydraulic fluid sent into the tubular mixing chamber. The tubular mixing chamber is connected to a diffuser section having a higher effective cross sectional area. This provides for a large Bernoulli effect pressure reduction in the tubular mixing chamber relative to ambient pressures, and the result is automatic draining or suction on all the other discharge nozzles which are in fluid communication with the torque converters that are intended to be drained and de-energized.

BRIEF DESCRIPTION OF THE DRAWINGS

FIG. 2 shows a cross sectional, axially facing view of the impeller and turbine blading geometries of the hydrodynamic torque converter;

Figure 3:
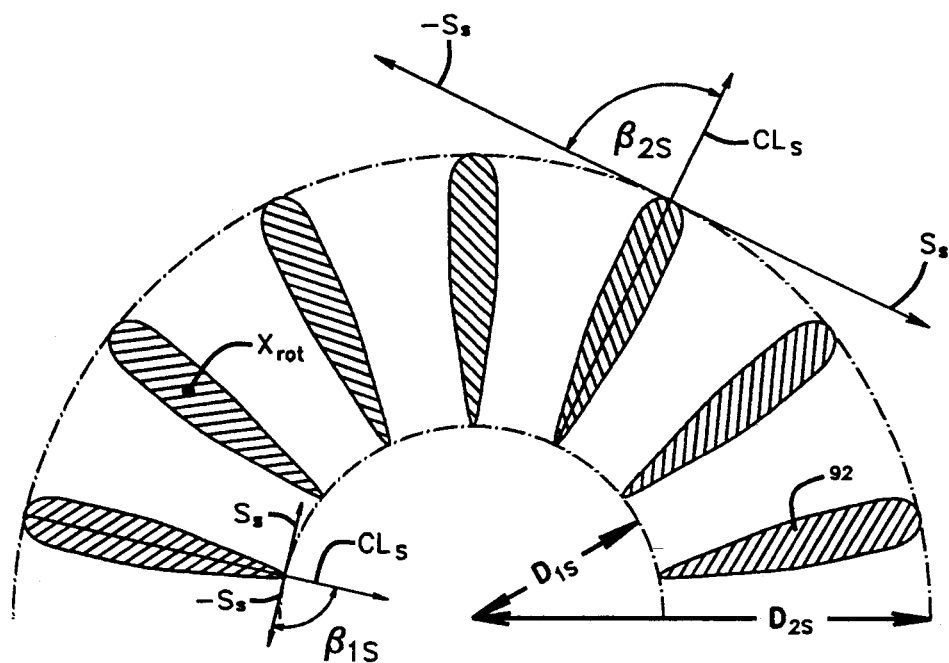
Figure 4:
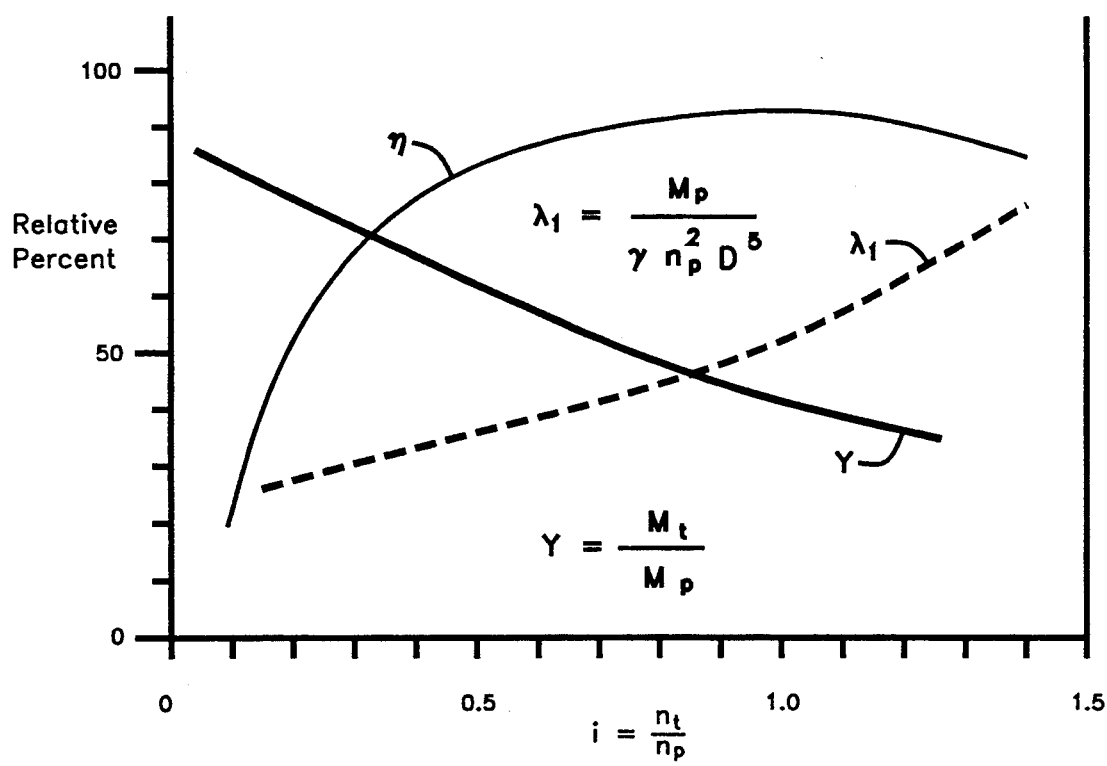
Figure 5:
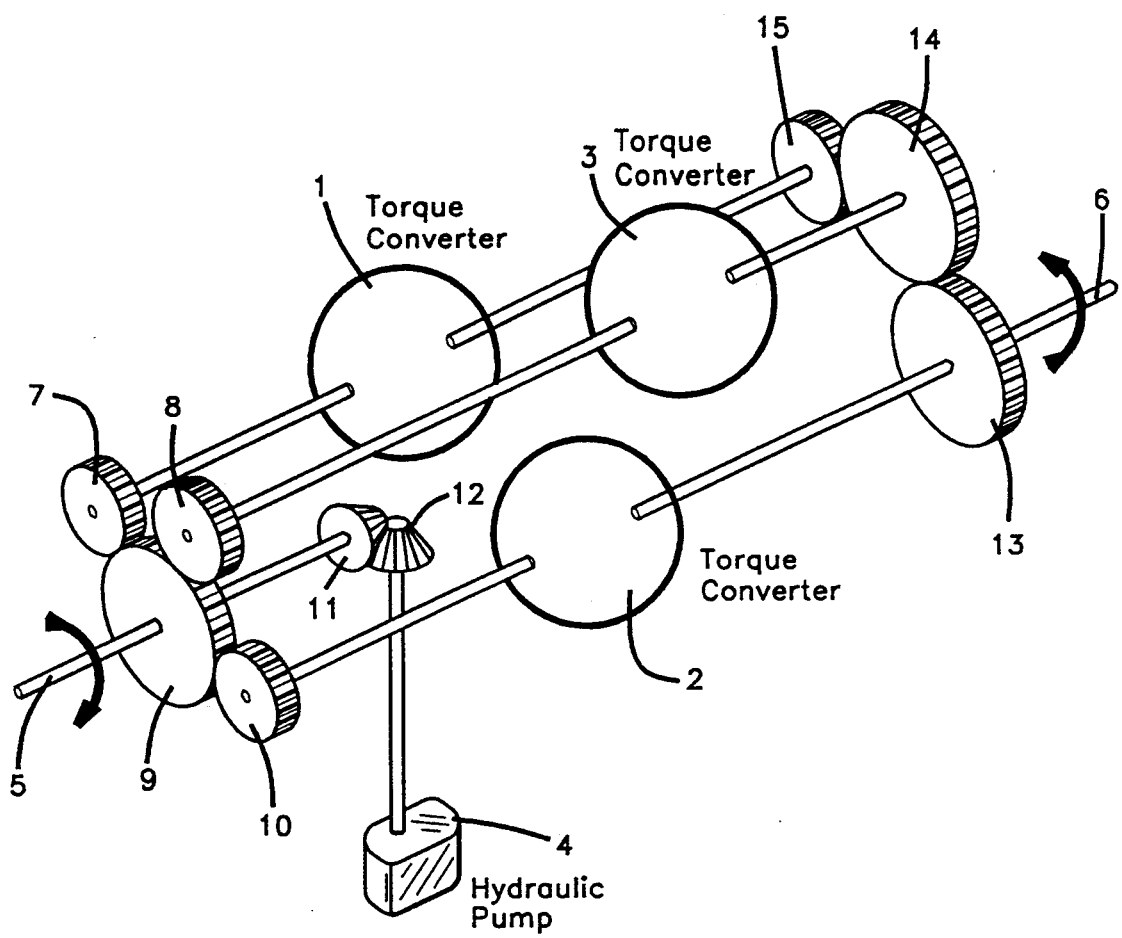
Figure 6:
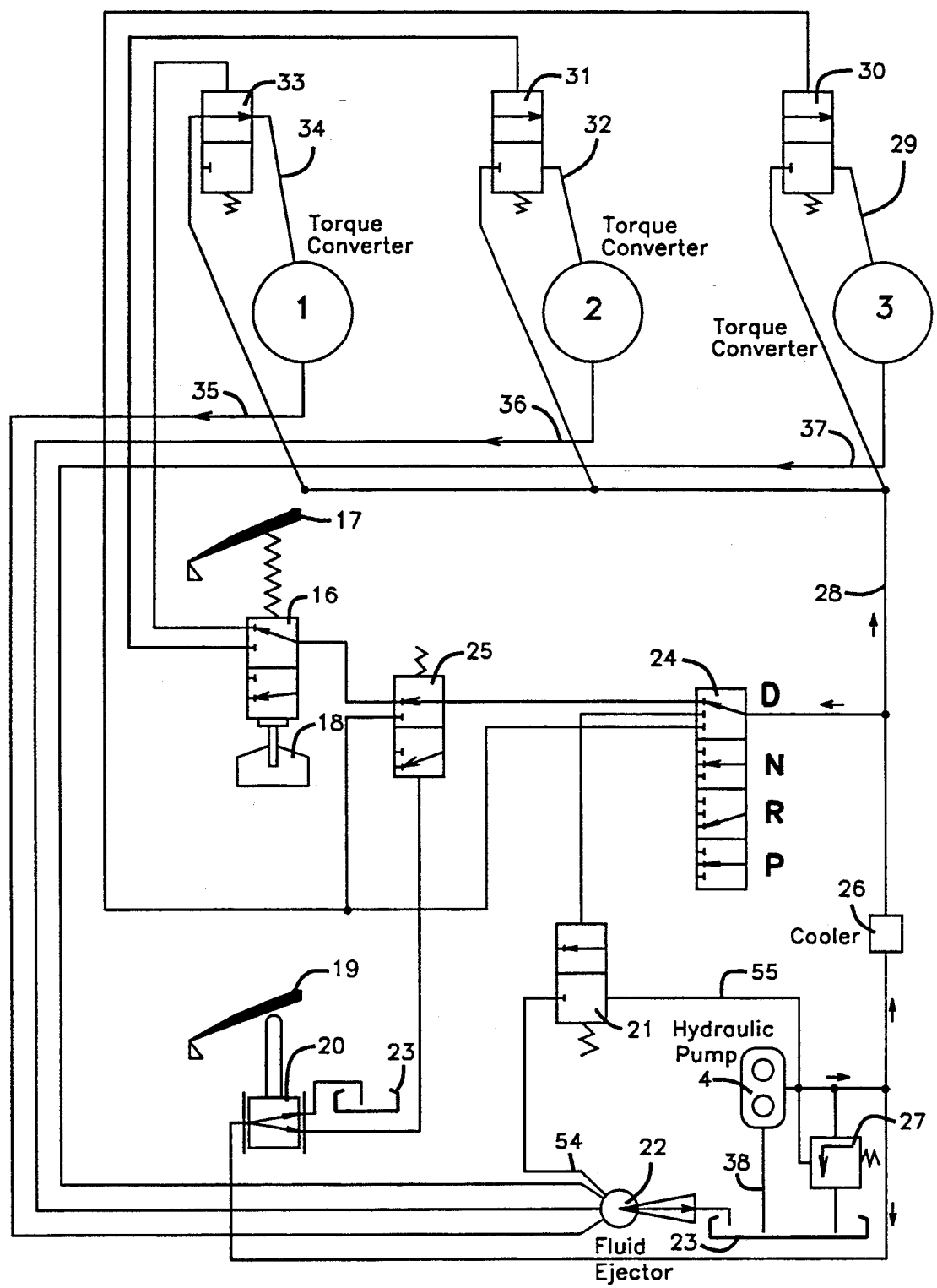
Figure 7:
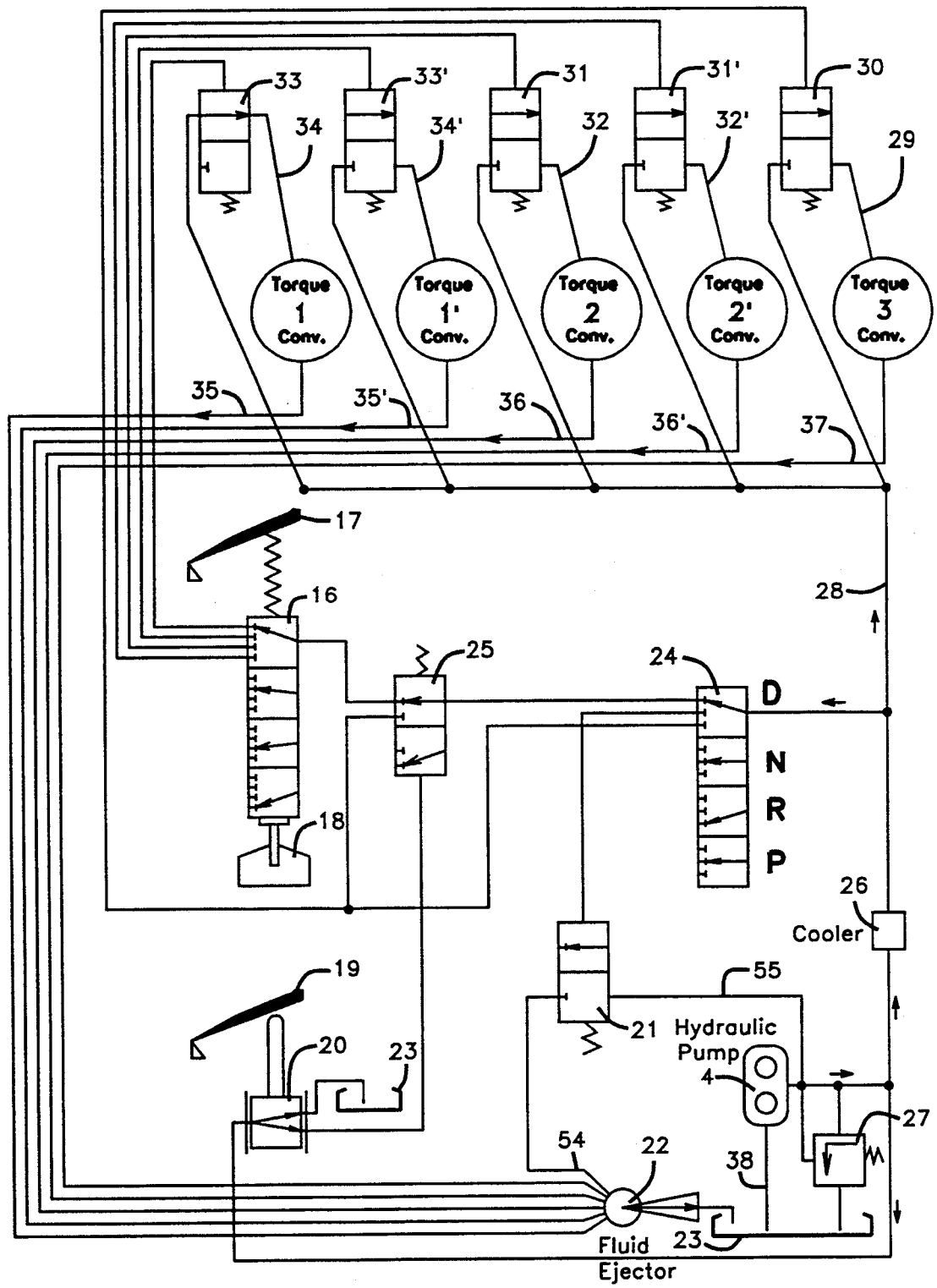
Figure 10:
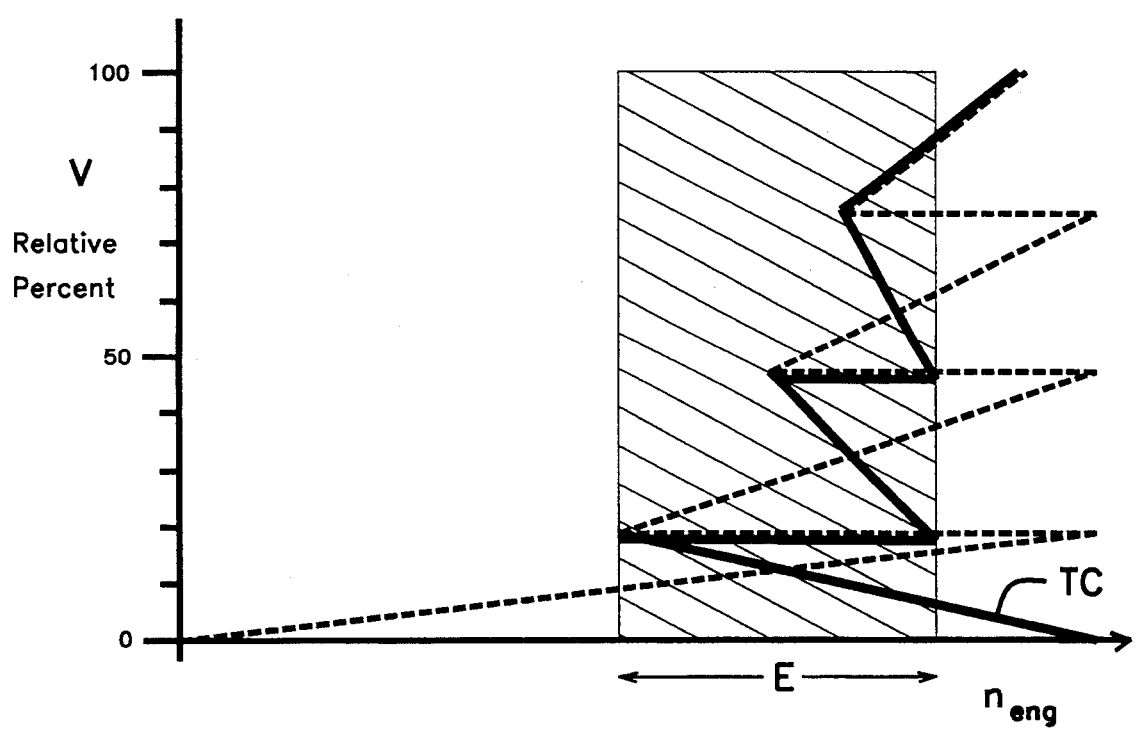

FIG. $2a_1$ and $2a_2$ show two selected cross sectional views from FIG. 2;

FIG. $2b_1$ and $2b_2$ show two selected angles from FIG. 2.;

FIG. 3 shows a cross sectional, axially facing view of the stator blading geometries of the hydrodynamic torque converter;

FIG. 4 shows a qualitative plot of some of the operating characteristics of the hydrodynamic torque converter;

FIG. 5 shows a shift coupling type transmission according to the present invention;

FIG. 6 shows a hydraulic control system for the transmission of FIG. 5;

FIG. 7 shows a hydraulic control system for a shift coupling type transmission of the present invention, and having provision for five different transmission ratio states, including reverse.; and FIGS. 8a, 8b, and 8c, show three operational cross sectional side views of the multi-nozzle fluid ejector shown in FIG. 6;

FIG. $8d_1$ to $8d_4$ show three operational cross sectional endon views of the multi-nozzle fluid ejector corresponding to the operating modes shown in FIGS. 8a, 8b, and 8c ;

FIGS. 9a, 9b, and 9c show three operational cross-sectional side views of another type of multi-nozzle fluid ejector shown in FIG. 6;

FIG. $9d_1$ to $9d_4$ show three operational cross sectional endon views of the multi-nozzle fluid ejector corresponding to the operating modes shown in FIGS. 9a, 9b, and 9c;

FIG. 10 shows a qualitative shift sequence diagram for a transmission having a conventional torque converter versus the transmission of this invention.

DETAILED DESCRIPTION OF THE INVENTION

Figure 1:
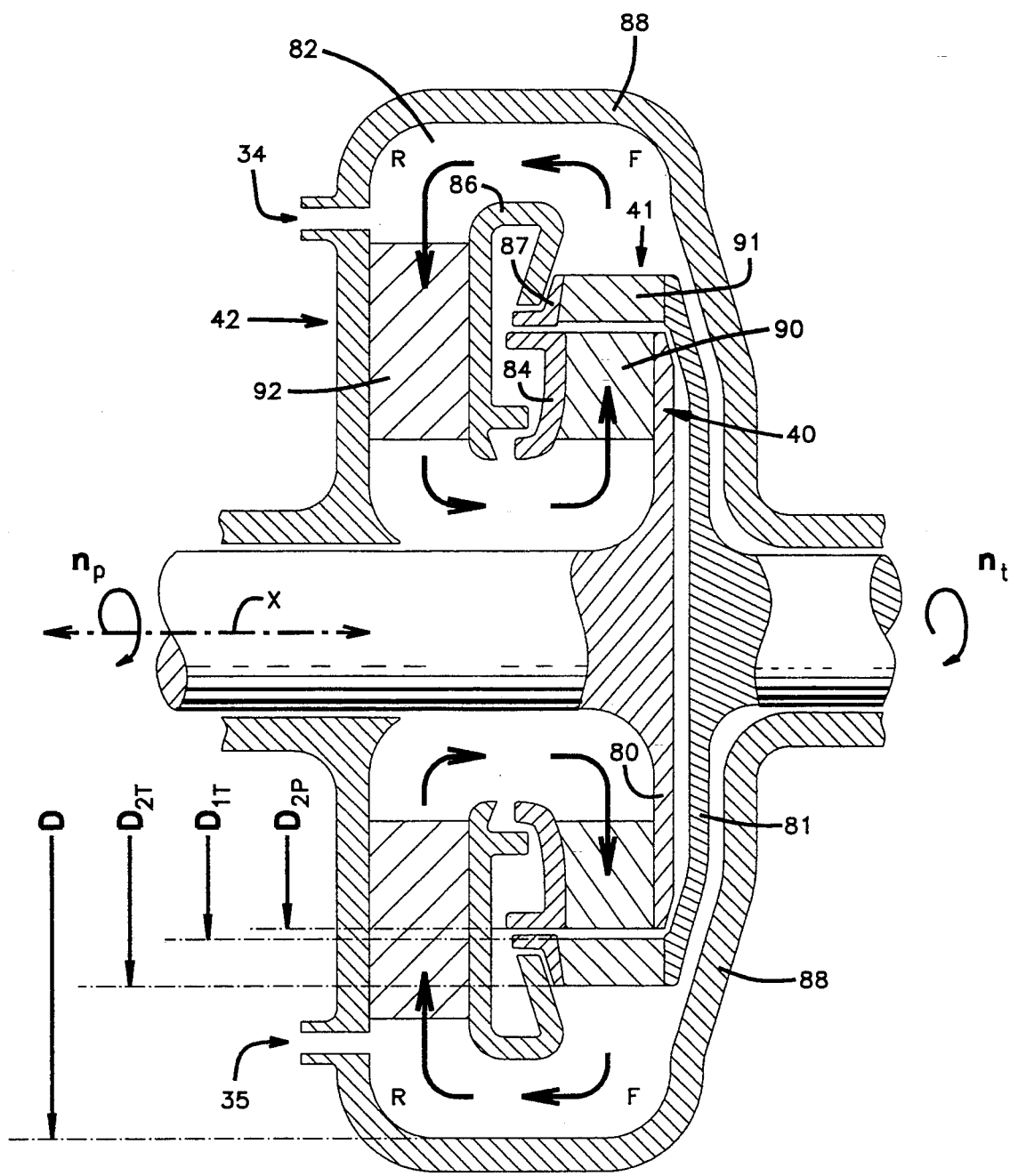
FIG. 1 shows a generally cross sectional view of the hydrodynamic torque converter of the present invention.

Referring to FIG. 1, a hydrodynamic torque converter of the present invention is shown in a cross sectional view. Torque converter shell 88 is fixed to the transmission case, and encloses a substantially toroidal fluid chamber 82. Toroidal fluid chamber 82 defines a converter axis X.

In this disclosure, angular deviations about converter axis X shall be termed circumferential; movements or indication along the length of converter axis X or any parallel line will be termed axial; and any relations involving perpendicular distances from the converter axis X will be termed radial.

Mechanically fixed to the torque converter shell 88 at the rearward axial region R of the toroidal fluid chamber 82 is a bladed centripetal stator 42 having an axis coinciding with converter axis X. Stator 42 has a plurality of somewhat radially directed blades or vanes 92 whose rearward axial edges are fixed to the rearward axial end of torque converter shell 88, and whose forward axial edges are fixed to or integral with annular stator core 86.

Extending through the axial forward region F of the torque converter is a bladed centrifugal impeller 40, having an axis of rotation coinciding with converter axis X. Impeller 40 comprises an impeller hub 80 to which a plurality of somewhat radially directed impeller blades 90 are fixed. The rear axial edges of impeller blades 90 are fixed to an annular impeller core 84, and the forward axial edges are fixed to or integral with impeller hub 80.

Extending through the forward axial end of the torque converter is a bladed centrifugal turbine 41, having an axis of rotation in common with converter axis X. Turbine 41 comprises a plurality of turbine blades 91 whose forward axial edges are fixed to turbine hub 81, and whose rear axial edges are fixed to turbine core 87. Fluid flow in the torque converter is shown by arrows.

Only the cyclic arrangement of the torque converter elements with respect to the fluid flow is important. That is, one can rearrange the elements in any way desired so long as the order of the torque converter elements in the direction of the normal fluid flow is the same: impeller, turbine, and stator. As long as a centrifugal impeller is used, located immediately proximate a centrifugal turbine, with no intermediary element between them, the stator may be located at an arbitrary location in the toroidal fluid chamber 82. The invention may be practiced, for example, by using centrifugal turbine and impeller elements, located in what is shown in Fig. 1 as the rearward axial region R, with the turbine radially outside the impeller and the stator fixed anywhere in the order of fluid flow after the turbine and before the impeller.

Through the use of seals and bearings, as is well known in the art, the torque converter toroidal fluid chamber 82 is effectively a closed system, except for orifices 34 and 35, used for filling and draining, respectively, the toroidal fluid chamber 82.

Referring to FIG. 2, a cross sectional, axially facing view of part of the blading and geometries of the hydrodynamic torque converter is shown. In this view, the viewer is looking directly at the forward axial end of the converter from the vantage point of the rearward axial end of the converter. The directions of the rotation of the turbine and impeller are shown by the speed arrows $n_T$ and $n_P$, respectively. Turbine blades 91 are shown, having outer or exit edges that lie at a maximum effective outer diameter $D_{2T}$, giving the turbine blades 91 an effective outer diameter $D_{2T}$, and having inner or entrance edges that lie at a minimum effective inner diameter $D_{1T}$, giving the turbine blades 91 an effective inner diameter $D_{1T}$ substantially as shown.

Although impeller blades 90 may be made all equal in length, it is preferred to have half of all impeller blades 90 be short impeller blades 90-S, having outer or exit edges that lie at a maximum effective outer diameter $D_{2P}$, giving the short impeller blades 90-S an effective outer diameter $D_{2P}$, and having inner or entrance edges that lie at a minimum effective inner diameter $d_{1P}$, giving the short impeller blades 90-S an effective inner diameter $d_{1P}$. The other half of impeller blades 90 are long impeller blades 90-L, having outer or exit edges that lie at a maximum effective outer diameter $D_{2P}$, giving the long impeller blades 90-L an effective outer diameter $D_{2P}$, and having inner or entrance edges that lie at a minimum effective inner diameter $D_{1P}$, giving the long impeller blades 90-L an effective inner diameter $D_{1P}$.

Preferably, long impeller blades 90-L have inner entrance edges substantially parallel to the impeller axis of rotation, with the effective long blade inner diameter $D_{1P}$ such that the ratio of the effective impeller outer diameter $D_{2P}$ to the effective impeller long blade inner diameter $D_{1P}$, $D_{2P}/D_{1P}$, is between 1.35 and 1.75, inclusive, $$1.35 \leq D_{2P}/D_{1P} \leq 1.75$$

but preferably it should be between 1.45 and 1.55.

Similarly, short impeller blades 90-S also have inner entrance edges substantially parallel to the impeller axis of rotation, with the effective impeller short blade inner diameter $d_{1P}$ such that the ratio of the effective impeller outer diameter $D_{2P}$ to the effective impeller short blade inner diameter $d_{1P}$, $D_{2P}/d_{1P}$, is between 1.1 and 1.4 inclusive, $$1.1 \leq D_{2P}/d_{1P} \leq 1.4$$

but preferably it should be between 1.18 and 1.25.

Overall the ratio of the turbine effective outer diameter $D_{2T}$, to the impeller effective outer diameter $D_{2P}$ should be between 1.15 and 1.45 inclusive, $$1.15 \leq D_{2T}/D_{2P} \leq 1.45$$

but preferably it should be between 1.18 and 1.25.

The difference or gap between the effective turbine inner diameter $D_{1T}$ and the effective impeller outer diameter, $D_{2P}$ should be small.

Now also referring to FIGS. $2a_1$ and $2a_2$, which show two selected cross sectional views $E_1$ and $E_2$ from FIG. 2, one can see from view $E_1$ that impeller blades 90 are mounted with axially rearward and axially forward edges fixed to impeller core 84 and impeller hub 80, respectively, with the blade surface at about 90 degrees with respect to the planes of both impeller core 84 and impeller hub 80. Similarly from view $E_2$, one can see that turbine blades 91 are mounted with axially rearward and axially forward edges fixed to turbine core 87 and turbine hub 81, respectively, with the blade surface at about 90 degrees with respect to the planes of turbine core 87 and turbine hub 81.

Now also referring to FIGS. $2b_1$ and $2b_2$, which show two selected angles $\beta_{2P}$ and $\beta_{2T}$ from FIG. 2, each of short impeller blades 90-S and long impeller blades 90-L has an exit angle $\beta_{2P}$, which for each impeller blade is defined as the angle between

[1] a tangential line $T_{cl(P)}$ to a central or meridian line $CL_P$ of impeller blade 90, at its radially outer edge, directed radially outward, and

[2] a line -$U_P$ oriented opposite the tangential impeller velocity vector $U_P$ at the radially outer edge of the impeller blade 90, and sharing its origin A with the tangential line $T_{cl(P)}$.

Turbine blades 91 each have an exit angle $\beta_{2T}$, which for each turbine blade is defined as the angle between

[1] a tangential line $T_{cl(T)}$ to a central or meridian line $CL_T$ of turbine blade 91, at its radially outer edge, directed radially outward, and

[2] a line -$U_T$ oriented opposite the tangential turbine velocity vector $U_T$ at the radially outer edge of the turbine blade 91 and sharing its origin B with the tangential line $T_{cl(T)}$.

Each impeller blade has an exit angle $\beta_{2P}$ between 140 and 170 degrees, inclusive, $$140 \leq \beta_{2P} \leq 170$$

but preferably it should be between 150 and 160 degrees.

Each turbine blade has an exit angle $\beta_{2T}$ between 14 and 30 degrees, inclusive, $$14 \leq \beta_{2T} \leq 30$$

but preferably it should be between 16 and 21 degrees.

For both the impeller and turbine, blade entrance angles may be chosen following the known art; definitions are similar to those above for the exit angles, except references to "radially outer" and "radially outward" should be changed to "radially inner" or "radially inward," respectively.

Referring to FIG. 3, a cross sectional, axially facing view of the stator blading geometries is shown. Orientation of the stator blades 92 may be chosen as is known in the art, but merely as an example, either flat or hydrofoil-type radial blades may be used, with entrance angle $\beta_{2S}=90$ degrees at the outer radial edge as shown. The entrance angle $\beta_{2S}$ is defined as the angle between [1] a line $-S_s$ oriented opposite the tangential fluid swirl velocity vector $S_s$ at the edge of stator blade 92, and [2] a central or meridian line $CL_s$ in stator blade 92, at its radially outer edge, directed radially outward. An exit angle $\beta_{1S}=90$ degrees may be specified, having a definition similar to that above for the entrance angle $\beta_{2S}$, except references to "radially outer" and "radially outward" should be changed to "radially inner" or "radially inward," respectively. Flat, non-bent blades may be used, with an exit angle $\beta_{1S}=90$ degrees.

It is also possible, but not required, to have provision for rotating each stator blade 92 about an axis of rotation $X_{rot}$ as is known in the art, to optimize stator operation for various speed ratios $i=n_t/n_p$ in the range $0 \leq i \leq 1.3$. Although the axis of rotation $X_{rot}$ is shown passing through the stator blade 92, the axis may also be displaced and located outside of the stator blade itself.

The numbers of blades utilized in the stator, turbine, and impeller can be chosen according to methods known in the art. Blades may be thin, as when fabricated from sheet metal, or may be thick cast "hydrofoil"-type members designed to improve efficiency and torque conversion characteristics, as is known in the art. [refs: US Pat. No. 5,037,272 *Toque Convener Turbine*, Robert R. By; see also *A New Approach to Developing a More Efficient Toque Convener Stator*, Eiji Ejiri, Nissan Motor Co., SAE paper 901765] Torque converter elements may be fabricated using techniques well known in the art, including using dies to fashion sheet metal elements; or casting, using sand, plaster core molds, or the lost plastic or lost foam process. For small units such as those in accordance with the present invention, die casting may be practical.

To commence operation of the torque converter, hydraulic or transmission fluid is introduced via orifice 34. To prevent cavitation in the torque converter when used at high impeller speeds, charging pressures of 7-10 atmospheres are recommended. This is higher than the 2-5 atmospheres used in most conventional automotive torque converters using lower impeller speeds.

The above specified internal configuration, blading, and other internal geometries result in many advantageous operating characteristics for the torque converter. The small gap between the effective turbine inner diameter $D_{1T}$ and the effective impeller outer diameter, $D_{2P}$ gives minimum hydraulic losses and maximum torque on the turbine shaft. The use of long and short impeller blades 90-L and 90-S reduces flow crowding at the entrance to the impeller and helps to optimize the velocity profile (vector field) of the fluid flow in the region at the impeller discharge or exit region. This configuration for the impeller's flow path gives a maximum pressure head for a minimum impeller diameter. The preferred steep impeller exit angle $\beta_{2P}$ between 150 and 160 degrees yields a significant reduction in eddy current losses brought about by Coriolis forces acting on the hydraulic fluid between the impeller blades, in the inter-blade channels. Put another way, there is less "rubbing" or viscosity loss of the fluid as it passes out of the impeller blades due to the trimming back of the impeller blade exit angle at the discharge or exit region of the impeller.

The energy imparted to the hydraulic fluid by the spinning impeller may be put to two uses: creating static pressures around the periphery of the impeller that are higher than pressures that would prevail without impeller rotation; and creating a velocity distribution in the hydraulic fluid, known as dynamic pressure. The total hydraulic pressure, called the pressure head, is made up of static pressure and dynamic pressure.

The hydrodynamic torque converter of the instant invention creates a dynamic pressure (or the dynamic part of the total pressure head) that significantly exceeds the static pressure, constituting 75-80% of the full head or total pressure. This is in contrast to most centrifugal impellers which have a dynamic pressure contribution to the total (head) pressure of no more than 25-30% of the total pressure, with 70-75% of the head pressure being static pressure. [refs: A. J. Stepanoff, *Centrifugal and Axial Flow Pumps*, New York John Wiley, 1948; I. Karasik et al., *Pump Handbook*, McGraw Hill, 1976 ISBN 0-07-033301-7]

The dynamic pressure created by the impeller of the torque converter cannot be converted to useful work unless the dynamic pressures or pressure flows impact upon or enter a pressure gradient. If, for example, one expends great effort in blowing out air from one's pursed lips, the resultant dynamic pressure flow into the ambient air cannot do useful work unless a pressure gradient is interposed into the flow path. The obstacle provided by the radial blades of a child's pinwheel can provide such a pressure gradient, and indeed, a pinwheel is a rudimentary turbine of sorts.

In the hydrodynamic torque converter, the turbine blade geometries are positioned to give the optimum conversion of the dynamic pressure of the impeller into mechanical work, namely, the exit angle $\beta_{2T}$ of each turbine blade is preferably between 16 and 21 degrees, and the exit edges of the turbine blades are positioned at a diameter exceeding that of the impeller by 18-25% (i.e., $1.18 \leq D_{2T}/D_{2P} \leq 1.25$).

The flow path for the turbine provides for maximum torque on the output shaft while maintaining high overall energy efficiency of the torque converter. Due to the fact that most of the force on the turbine is from conversion of the impeller's dynamic pressure portion of the total head, the efficiency remains high for a large range of speed ratios. For the speed ratio $i=n_t/n_p$ in the range $0.6 \leq i \leq 1.3$, efficiency of the torque converter ranges from 82-88%, with a maximum torque converter efficiency of 87-88% when i ranges from $0.8 \leq i \leq 1.05$.

Significantly, because of the relatively small static pressure created by the impeller, the flow velocity of the working fluid is strongly influenced by the hydraulic resistance of the turbine's inter-blade channels. As the turbine slows down for a given impeller speed, the hydraulic resistance of the fluid in the inter-blade channels increases. This causes a decreasing flow rate in the circulation path of the hydraulic fluid, which in turn produces a decrease of the power required by the impeller, giving a decrease of the torque on the impeller. This is a very unusual and unanticipated characteristic for a hydrodynamic torque converter, and it results in a lower torque coefficient $\lambda_1$ as the speed ratio $i=n_t/n_p$ approaches zero.

The resultant operation may be elucidated by referring to FIG. 4, which shows a qualitative plot of some of the operating characteristics of the hydrodynamic torque converter. The torque converter efficiency $\eta$, the torque coefficient $\lambda_1$, and the torque multiplication factor $Y=$turbine torque/impeller torque, are all plotted on a relative percentage scale versus the speed ratio $i=n_t/n_p$. Naturally, due to conservation of energy in the torque converter, the torque multiplication factor Y goes down with increasing speed ratio i. Interestingly, the torque coefficient $\lambda_1$ increases as the speed ratio i increases, with the torque converter absorbing more torque as the turbine speed increases. Efficient operation at speed ratios $i \leq 1$ is what provides for increased ratio range of this torque converter relative to conventional torque converters, where the $\lambda_1$ dependence is flat as a function of speed ratio i, and efficient operation at $i \leq 1$ is not possible.

Due to the small radial extent of the turbine blades, during coasting or overrun conditions where the load drives the engine, the reverse power flow through the converter is smaller than that encountered using conventional torque converters.

Merely by way of example a hydrodynamic torque converter of the present invention with effective (flow) torque converter diameter D of 132 mm, $D_{2T}/D_{2P}$ of 1.22, $D_{2P}/D_{1P}$ of 1.53, $D_{2P}/d_{1P}$ of 1.22, $\beta_{2P}=156°$, $\beta_{2T}$ of 19°, run at 13,000 RPM, a power of about 100 kW was transmitted across the torque converter at a torque of 72 NM.

Referring to FIG. 5, a simple vehicular shift coupling type transmission according to the present invention is shown. Transmission input driveshaft 5 is mechanically coupled to input drive gear 9 and hydraulic pump drive 11, which drives, via hydraulic pump driven gear 12, a conventional hydraulic pump 4 which provides pressurized hydraulic fluid for lubrication, transmission control, torque converter pressurization, and multi-nozzle fluid ejector requirements. Input drive gear 9 in turn drives differently sized drive gears 7, 10, and 8. Low drive gear 7 drives a first power transmitting path connected to the impeller of torque converter 1; high drive gear 10 drives a second power transmitting path connected to the impeller of torque converter 2; and reverse drive gear 8 drives a third power transmitting path connected to the impeller of torque converter 3. At the output end of the transmission, the respective turbines of torque converters 1, 2, and 3 are connected to low driven gear 15, high driven gear 13, and reverse driven gear 14, respectively. Low driven gear 15 is geared to reverse driven gear 14, which is in turn geared to high driven gear 13. Transmission output shaft 6 is connected to high driven gear 13. Low drive gear 7, reverse drive gear 8, input drive gear 9, and high drive gear 10 constitute the input geartrain of the transmission; high driven gear 13, reverse driven gear 14, and low driven gear 15 constitute the output geartrain of the transmission. (For the input or output geartrains of this transmission, one may substitute chain drives, which are often more efficient than drives using helical or spur gears.) Generally, this arrangement allows that energizing either torque converters 1 or 2 will result in rotation of the transmission output shaft 6 in the opposite sense with respect to the input driveshaft 5, while energizing torque converter 3 will result in like motion at transmission output shaft 6, which is arbitrarily selected here to supply reverse motion for the vehicle. Through judicious choice of gear sizes, the power transmitting path energized by filling torque converter 1 with hydraulic fluid using hydraulic pump 4 will give a low vehicular transmission ratio; filling torque converter 2 will give high vehicular transmission ratio; and filling torque converter 3 will give a reverse vehicular transmission ratio. In its simplest form, there are no multiple disc wet clutches or the like required for this transmission. Gearing may also provide for high rotational speeds of the torque converter impellers, allowing smaller diameter torque converters to be used.

This shifting coupling transmission provides for multiple power transmitting paths to which individual and independent torque converters are connected. Energizing each power transmitting path results in effecting a different transmission ratio. The individual power transmitting paths are selectively energized by filling with hydraulic fluid the corresponding torque converter, while the other torque converters are voided automatically. For cruising speeds, additional well known torque converter lockup provisions not shown can lockup selected torque converters for increased fuel economy.

Referring to FIG. 6, an example of a simple hydraulic control system for the transmission of FIG. 5 is shown. Fluid reservoir 23 is connected by pickup tube 38 to hydraulic pump 4. Some of the output of hydraulic pump 4 is fed through transmission cooler 26 to hydraulic main 28, which may incorporate accumulators or other fluid inventory management devices as are known in the art. For protection of all hydraulic circuits, hydraulic main 28 is connected to pressure relief valve 27. After passing through a series of hydraulic logic control valves and associated components 16, 17, 18, 19, 20, 21, 24, and 25, hydraulic fluid from hydraulic main 28 supplies hydraulic pressure to converter feed valve 33, converter feed valve 31, and converter feed valve 30, which, upon receiving the appropriate hydraulic signal, will selectively feed hydraulic line pressure from hydraulic main 28 to torque converters 1, 2, and 3, respectively. Converter feed valves 33, 31, and 30 are in fluid communication with the toroidal fluid chambers of torque converters 1, 2, and 3 via converter feed tubes 34, 32, and 29, respectively.

The toroidal fluid chambers of torque converters 1, 2, and 3 are in fluid communication with converter ejector tubes 35, 36, and 37, respectively, which in turn are in fluid communication with the inlet ends of the coaxial nested nozzles of multi-nozzle fluid ejector 22.

At any given time, only one or zero of converter feed valves 33, 31, or 30 is activated, allowing fluid from hydraulic main 28 to flood and pressurize the torque converter selected to be energized. Hydraulic fluid under a pressure of about 7–10 atmospheres then exits the selected torque converter through its associated converter ejector tube and is expelled through one nozzle of the multi-nozzle fluid ejector 22. All other nozzles are then by automatic action of the multi-nozzle fluid ejector 22 quickly evacuated to a pressure of about 0.05 to 0.1 atmospheres. For a transmission system at operating temperature, this is close to the saturated vapor pressure of the transmission or hydraulic fluid.

Referring as well now to FIG. 7, a simple hydraulic control system is shown for a shift coupling type transmission of the present invention, and having provision for five different transmission ratio states, including reverse. From inspection of FIG. 7, it can be seen that the preceding description applies here, except that torque converters 1' and 2' have been added to give additional ratio states. Associated primed reference characters have substantially the same role as the previously discussed unprimed characters. Additional input and output gearing similar to that shown in FIG. 5 may be added to accommodate the additional torque converters. The following description of the hydraulic logic will follow this figure, and analogous operation for the description of the hydraulic control system of FIG. 6 can be seen by inspection.

Hydraulic main 28 is connected to quadrant selector valve 24, which is selectable by the vehicle operator. At the "N" or "Neutral" position of the quadrant selector valve 24, hydraulic fluid from hydraulic main 28 is delivered to neutral cutout valve 21 via neutral cutout feed 55. This causes hydraulic fluid from hydraulic main 28 to be delivered directly to neutral nozzle 54, which by automatic action of the multi-nozzle fluid ejector 22 quickly evacuates all converters of the transmission, cutting transmission output entirely.

When quadrant selector valve 24 is in "D" or "Drive" position, hydraulic fluid from hydraulic main 28 is sent to hydrodynamic braking decision valve 25, which is normally not activated and sends the hydraulic fluid to shift decision valve 16. Shift decision valve 16 is influenced by throttle angle sensor 17 and vehicle speed sensor 18. For a vehicle at rest, shift decision valve 16 initially sends the hydraulic fluid to converter feed valve 33 to energize torque converter 1 (low gear). As vehicle speed increases, shift decision valve 16 generally sequentially feeds converter feed valve 33', converter feed valve 31, and then converter feed valve 31'. This automatic upshifting, calibrated by the action of shift decision valve 16 based on information from vehicle speed sensor 18, can be overridden by action of throttle angle sensor 17 which can cause shift decision valve 16 to effect a downshift to decrease the transmission ratio for hill climbing, acceleration, etc.

When brake pedal 19 is depressed, hydrodynamic braking signal valve 20 switches from a bleed state draining hydraulic fluid into fluid reservoir 23 to a reverse torque converter activation state, which causes hydraulic fluid to activate hydrodynamic braking decision valve 25. Hydrodynamic braking decision valve 25 sends hydraulic fluid from quadrant selector valve 24 to converter feed valve 30, thus activating the "reverse" torque converter 3, while at the same time discontinuing the oil supply to shift decision valve 16. This causes only torque converter 3 to be energized, and with forward motion of the vehicle, hydrodynamic vehicle braking will occur, with the vehicle wheels essentially driving the turbine of torque converter 3, relieving the load on the service brakes of the vehicle. Very little engine braking will occur, due to the small size of the turbine blades 91 as previously shown. During normal operation, when brake pedal 19 is released, hydrodynamic braking decision valve 25 deactivates, again sending oil to shift decision valve 16.

When "R" or "Reverse" is selected at quadrant selector valve 24, control oil from hydraulic main 28 is sent to converter feed valve 30, which opens to allow oil from the hydraulic main 28 to fill torque converter 3 via converter feed tube 29, effecting the reverse ratio state. The multi-nozzle fluid ejector 22 again assures that all other torque converters are drained and ineffective.

When "P" or "Park" is selected at quadrant selector valve 24, hydraulic control operation is similar to that described for the "Neutral" selection, with control oil sent from hydraulic main 28 to neutral cutout valve 21, allowing full feed of neutral nozzle 54, assuring action of the multi-nozzle fluid ejector 22 that all other torque converters are drained. For safety, the "park" position may also result in having a ratchet and pawl mechanism lockup of the transmission output shaft.

The above system of hydraulic controls may be implemented using electrical, mechanical, hydraulic, pneumatic or electrorheological controls, and control systems different from that described can be used without departing from the substance of the invention.

Referring now to FIGS. 8a, 8b, and 8c, three operational cross sectional views of the multi-nozzle fluid ejector 22 of FIG. 6 are shown, as viewed from the side. Multi-nozzle fluid ejector 22 comprises coaxial nested nozzles N1, N2, N3, and N4 having respective outlet ends OUT1, OUT2, OUT3, and OUT4, and respective inlet ends that are connected to converter ejector tubes 37, 36, 35, and neutral nozzle 54 respectively. Tubular mixing chamber MC surrounds and seals nozzle N4 to form a closed volume exposed to the outlet ends OUT1, OUT2, OUT3, and OUT4. The right axial end of mixing chamber MC opens up into a diffuser section DF having a larger cross-sectional area.

In Fig. 8a, oil is shown discharged from converter ejector tube 35 through nozzle N3 to outlet end OUT3, creating a Bernoulli effect partial vacuum in the mixing chamber MC. This drains and voids all other nozzles, and the respective converter ejector tubes to which they are in fluid communication, namely, converter ejector tubes 36, 37, and neutral nozzle 54.

In Fig. 8b, when the oil supply has been switched from converter ejector tube 35 to converter ejector tube 36, then the roles of 35 and 36 are switched. Only coaxial nozzle N2 has oil being discharged, and the Bernoulli induced partial vacuum will automatically drain all other nozzles and the converter toroidal fluid chambers or other elements to which they are connected.

In FIG. 8c, oil is shown discharging from central nozzle N1 from converter ejector tube 37, and again, all other nozzles and their respective converter ejector tubes and associated components are voided by partial vacuum created in the mixing chamber MC.

FIGS. $8d_1$ to $8d_4$ shows the coaxial nested nozzles N1, N2, N3, and N4 in cross section, viewed end-on as seen from mixing chamber MO, for each respective case shown in FIGS. 8a, 8b, and 8c. The smallest nested nozzle N1 is coaxial with subsequent larger radius nozzles N2, N3, and N4. The respective circular or annular cross-sectional area of coaxial nested nozzles N1, N2, N3, and N4 as shown in this figure should be about the same, to enhance the efficiency of the multi-nozzle fluid ejector 22.

Referring now to FIGS. 9a, 9b, 9c, and $9d_1$ to $9d_4$ an alternative non-nested structure for the multi-nozzle fluid ejector 22 is shown in similar operational cross sectional views, with FIGS. 9a, 9b, and 9c again showing cross sectional views of the multi-nozzle fluid ejector 22 viewed from the side, and FIGS. $9d_1$ to $9d_4$ showing end-on cross sectional views as seen from the mixing chamber MC for each respective case shown in FIGS. 9a, 9b, and 9c. The four nozzles N1, N2, N3, and N4 are now shown, not nested or coaxial with one another, but simply in proximity with one another, with their outlet ends OUT1–OUT4 facing the open end of the mixing chamber MC as shown. The Bernoulli effect-induced draining of all unfed nozzles proceeds as previously given.

The operation of multi-nozzle fluid ejector 22 is automatic, reliable, and swift. Drain times for the torque converters can be 0.03–0.1 seconds, allowing rapid, trouble-free shifts in transmission ratio to suit varying load conditions.

Now referring to FIG. 10, a full throttle qualitative shift sequence diagram is shown for a 4-speed automatic transmission having a conventional torque converter versus the transmission of this invention having three unlocked torque converters, and using direct overdrive gearing at the top or fourth ratio state. The diagram shows roughly the locus of points on a cartesian plot of vehicle speed (V) versus engine speed ($n_{eng}$). The rough sequence for a transmission having a conventional torque converter is shown with a dotted line, while the probable rough shift sequence for a transmission of this invention is shown by a solid line. A preferred range of engine speeds $n_{eng}$ is indicated by the shaded portion of the plot defined by interval E. Nearly horizontal lines represent fast transmission ratio changes. For a conventional transmission, ignoring the immediate ramp up of engine speed to meet the effective stall speed, engine speed with the vehicle starting at rest goes up monotonically with vehicle speed, until the second transmission ratio is selected, represented by a horizontal line. This sequence continues in the same pattern until fourth gear, when engine speed continues indefinitely to rise with increasing vehicle speed.

For the transmission of this invention, however, the solid line TC indicates a qualitatively different evolution of engine speed with increasing vehicle speed. Because of the specifed relationships between the impeller and turbine diameters, and the specified exit angles of their blades, the torque at the impeller shaft actually increases with increasing turbine speed. This causes the engine speed to actually decrease from a relative maximum during the initial acceleration in first gear, until the second transmission ratio is selected. A similar inverted engine speed evolution profile occurs in subsequent gears or transmission ratio states. A shift out of the third ratio state into a conventional overdrive gear, without the use of a torque converter, gives the final upward segment of solid line TC. This provides for engine operation within optimal regimes giving high fuel efficiency. With fast switching of torque converters to be energized, engine loading and speed can be controlled with a minimum of shift shock. The extension phase where the speed ratio i exceeds one allows longer dwell times in each ratio state, relative to a transmission having a conventional torque converter.

Obviously, many modifications and variations of the present invention are possible in light of the above teaching. It is therefore to be understood, that within the scope of the appended claims, the invention may be practiced otherwise than as specifically described or suggested here.

We claim:

1. A hydrodynamic torque converter, comprising:
   a bladed centrifugal impeller;
   a bladed centrifugal turbine;
   a bladed stator;
   a shell defining a toroidal fluid chamber, said toroidal fluid chamber establishing a converter axis (X);
   said bladed centrifugal impeller being positioned within said toroidal fluid chamber and sharing an impeller axis of rotation with said converter axis;
   said bladed centrifugal turbine being positioned immediately proximate said bladed centrifugal impeller inside said toroidal fluid chamber, and sharing a turbine axis of rotation with said converter axis;
   said bladed stator being positioned within said toroidal fluid chamber, and sharing a stator axis with said converter axis;
   said bladed centrifugal impeller being rotatable about said impeller axis of rotation and having a plurality of impeller blades fixed thereto;
   each said impeller blade having an impeller blade exit angle $\beta_{2P}$ between 140 and 170 degrees, inclusive;
   said bladed centrifugal turbine being rotatable about said turbine axis of rotation and having a plurality of turbine blades fixed thereto;
   each said turbine blade having a turbine blade exit angle $\beta_{2T}$ between 14 and 30 degrees, inclusive; and
   said bladed centrifugal turbine having an effective turbine outer diameter ($D_{2T}$), and said bladed centrifugal impeller having an effective impeller outer diameter ($D_{2P}$), such that the ratio of the effective turbine outer diameter to the effective impeller outer diameter, ($D_{2T}/D_{2P}$), is between 1.15 and 1.45, inclusive.

2. The hydrodynamic torque converter of claim 1, wherein some of the impeller blades are long blades, having inner entrance edges substantially parallel to the impeller axis of rotation, said entrance edges defining an effective impeller long blade inner diameter ($D_{1P}$) such that the ratio of said effective impeller outer diameter ($D_{2P}$) to the effective impeller long blade inner diameter ($D_{1P}$), ($D_{2P}/D_{1P}$), is between 1.35 and 1.75, inclusive;
   and wherein some of the impeller blades are short blades, having inner entrance edges substantially parallel to the impeller axis of rotation, said entrance edges defining an effective impeller short blade inner diameter ($d_{1P}$) such that the ratio of said effective impeller outer diameter ($D_{2P}$) to the effective impeller short blade inner diameter ($d_{1P}$), ($D_{2P}/d_{1P}$), is between 1.1 and 1.4, inclusive.

3. An automatic transmission using multiple hydrodynamic torque converters, comprising:
   input and output shafts;
   first and second hydrodynamic torque converters, each of said first and second hydrodynamic torque converters comprising:
   a bladed centrifugal impeller;
   a bladed centrifugal turbine;
   a bladed stator;
   a shell defining a toroidal fluid chamber, said toroidal fluid chamber establishing a converter axis (X);
   said bladed centrifugal impeller being positioned within said toroidal fluid chamber and sharing an impeller axis of rotation with said converter axis;
   said bladed centrifugal turbine being positioned immediately proximate said bladed centrifugal impeller inside said toroidal fluid chamber, and sharing a turbine axis of rotation with said converter axis;
   said bladed stator positioned within said toroidal fluid chamber, and sharing a stator axis with said converter axis;
   said bladed centrifugal impeller being rotatable about said impeller axis of rotation and having a plurality of impeller blades fixed thereto;
   each said impeller blade having an impeller blade exit angle $\beta_{2P}$ between 140 and 170 degrees, inclusive;
   said bladed centrifugal turbine being rotatable about said turbine axis of rotation and having a plurality of turbine blades fixed thereto;
   each said turbine blade having a turbine blade exit angle $\beta_{2T}$ between 14 and 30 degrees, inclusive;
   said bladed centrifugal turbine having an effective turbine outer diameter ($D_{2T}$), and said bladed centrifugal impeller having an effective impeller outer diameter ($D_{2P}$), such that the ratio of the effective turbine outer diameter to the effective impeller outer diameter, ($D_{2T}/D_{2P}$), is between 1.15 and 1.45, inclusive;

an input geartrain for individually coupling said input shaft to the bladed centrifugal impellers of said first and second hydrodynamic torque converters;

an output geartrain for individually coupling said output shaft to the bladed centrifugal turbines of said first and second hydrodynamic torque converters;

means for selectively filling said first and second hydrodynamic torque converters; and means for selectively draining said first and second hydrodynamic torque converters.

4. The automatic transmission of claim 3, wherein some of the impeller blades are long blades, having inner entrance edges substantially parallel to the impeller axis of rotation, said entrance edges defining an effective impeller long blade inner diameter ($D_{1P}$) such that the ratio of said effective impeller outer diameter ($D_{2P}$) to the effective impeller long blade inner diameter ($D_{1P}$), ($D_{2P}/D_{1P}$), is between 1.35 and 1.75 inclusive;

and wherein some of the impeller blades are short blades, having inner entrance edges substantially parallel to the impeller axis of rotation, said entrance edges defining an effective impeller short blade inner diameter ($d_{1P}$) such that the ratio of said effective impeller outer diameter ($D_{2P}$) to the effective impeller short blade inner diameter ($d_{1P}$), ($D_{2P}/d_{1P}$), is between 1.1 and 1.4, inclusive.

5. The automatic transmission of claim 3, further comprising:

a multi-nozzle fluid ejector for use in selectively draining one of said first and second hydrodynamic torque converters when said means for selectively filling fills the other of said first and second hydrodynamic torque converters, said multi-nozzle fluid ejector comprising:

a first nozzle having an inlet end in fluid communication with said toroidal fluid chamber of said first hydrodynamic torque converter;

a second nozzle having an inlet end in fluid communication with said toroidal fluid chamber of said second hydrodynamic torque converter, said second nozzle being substantially coaxial to, and nesting with, said first nozzle;

said first and second nozzles having first and second outlet ends, respectively; and an essentially tubular mixing chamber surrounding and substantially sealing the larger of said first and second outlet ends from an ambient atmosphere surrounding said multi-nozzle fluid ejector, with said essentially tubular mixing chamber being in fluid communication with said first and second outlet ends;

whereby upon having said means for selectively filling fill one of said first and second hydrodynamic torque converters, the other of said first and second hydrodynamic torque converters will be drained by Bernoulli effect-induced partial vacuum on the respective nozzle to which its toroidal fluid chamber is in fluid communication.

6. The automatic transmission of claim 5, wherein said multi-nozzle fluid ejector further comprises:

a third nozzle having an inlet end in fluid communication with a neutral quadrant control valve, said third nozzle being substantially coaxial to, and nesting with, one of said first and second nozzles;

said neutral quadrant control valve having means to allow a pressurized hydraulic fluid through said neutral quadrant control valve to said inlet end of said third nozzle upon actuation of said neutral quadrant control valve;

said third nozzle having a third outlet end; and said essentially tubular mixing chamber surrounding and substantially sealing the largest of said first, second and third outlet ends from an ambient atmosphere surrounding said multi-nozzle fluid ejector, with said essentially tubular mixing chamber being in fluid communication with said first, second and third outlet ends;

whereby when the neutral quadrant control valve is in the "Neutral" position, both said first and second hydrodynamic torque converters are drained by Bernoulli effect-induced partial vacuum on the respective nozzles to which their toroidal fluid chambers are in fluid communication.

7. A multi-nozzle fluid ejector for use in selectively draining one of first and second volumes while the other of said first and second volumes is filled by a means for selectively filling the other said volume, said multi-nozzle fluid ejector comprising:

a first nozzle having an inlet end in fluid communication with one of said first and second volumes;

a second nozzle having an inlet end in fluid communication with the other of said first and second volumes, said second nozzle being substantially coaxial to, and nesting with, said first nozzle;

said first and second nozzles having first and second outlet ends, respectively; and an essentially tubular mixing chamber surrounding and substantially sealing the larger of said first and second outlet ends from an ambient atmosphere surrounding said multi-nozzle fluid ejector, said essentially tubular mixing chamber being in fluid communication with said first and second outlet ends;

whereby upon having said means for selectively filling fill one of said first and second volumes, the other of said first and second volumes will be drained by Bernoulli effect-induced partial vacuum on the respective nozzle to which its volume is in fluid communication.

8. The multi-nozzle fluid ejector of claim 7, for use in selectively draining two of said first volume, said second volume, and a third volume, while the one other of said first, second and third volumes is filled by said means for selectively filling, said multi-nozzle fluid ejector further comprising:

a third nozzle having an inlet end in fluid communication with said third volume, said third nozzle being substantially coaxial to, and nesting with, one of said first and second nozzles;

said third nozzle having a third outlet end; and said essentially tubular mixing chamber surrounding and substantially sealing the largest of said first, second and third outlet ends from the ambient atmosphere surrounding said multi-nozzle fluid ejector, said essentially tubular mixing chamber being in fluid communication with said first, second and third outlet ends;

whereby upon having said means for selectively filling fill one of said first, second and third volumes, the other two of said first, second and third volumes will be drained by Bernoulli effect-induced partial vacuum on the respective nozzles to which their volumes are in fluid communication.

9. A multi-nozzle fluid ejector for use in selectively draining one of first and second volumes while the other of said first and second volumes is filled by a means for selectively filling the other said volume, said multi-nozzle fluid ejector comprising:

an essentially tubular mixing chamber having one open end and one closed end;

a first nozzle having an inlet end in fluid communication with one of said first and second volumes;

a second nozzle having an inlet end in fluid communication with the other of said first and second volumes;

said first and second nozzles having first and second outlet ends, respectively, and having said outlet ends located inside said essentially tubular mixing chamber; and said first and second nozzles being situated such that said first and second outlet ends are mutually proximate inside said closed end of said essentially tubular mixing chamber and oriented to face said open end thereof, said respective inlet ends of said first and second nozzles being situated outside of said essentially tubular mixing chamber;

whereby upon having said means for selectively filling fill one of said first and second volumes, the other of said first and second volumes will be drained by Bernoulli effect-induced partial vacuum on the respective nozzle to which its volume is in fluid communication.

10. The multi-nozzle fluid ejector of claim 9, for use in selectively draining two of said first volume, said second volume, and a third volume, while another of said first, said second, and said third volumes is filled by said means for selectively filling, said multi-nozzle fluid ejector further comprising:

a third nozzle having an inlet end in fluid communication with said third volume;

said third nozzle having a third outlet end located inside said essentially tubular mixing chamber; and said first, second and third nozzles being situated such that said first, second and third outlet ends are mutually proximate inside said closed end of said essentially tubular mixing chamber and oriented to face said open end thereof, said respective inlet ends of said first, second and third nozzles being situated outside of said essentially tubular mixing chamber;

whereby upon having said means for selectively filing fill one of said first, second and third volumes, the other two of said first, second and third volumes will be drained by Bernoulli effect-induced partial vacuum on the respective nozzles to which they are in fluid communication.

* * * * *